(12) United States Patent
Ulrich et al.

(10) Patent No.: US 11,614,920 B2
(45) Date of Patent: Mar. 28, 2023

(54) BYPASSING ZERO-VALUE MULTIPLICATIONS IN A HARDWARE MULTIPLIER

(71) Applicant: Meta Platforms, Inc., Menlo Park, CA (US)

(72) Inventors: Thomas Mark Ulrich, Mountain View, CA (US); Abdulkadir Utku Diril, Menlo Park, CA (US); Zhao Wang, Newark, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 49 days.

(21) Appl. No.: 16/869,288

(22) Filed: May 7, 2020

(65) Prior Publication Data
US 2021/0349694 A1    Nov. 11, 2021

(51) Int. Cl.
| | | |
|---|---|---|
| *G06F 7/575* | (2006.01) | |
| *G06F 7/483* | (2006.01) | |
| *G06F 7/523* | (2006.01) | |
| *G06F 17/16* | (2006.01) | |
| *G06N 3/02* | (2006.01) | |

(52) U.S. Cl.
CPC .............. *G06F 7/575* (2013.01); *G06F 7/483* (2013.01); *G06F 7/523* (2013.01); *G06F 17/16* (2013.01); *G06N 3/02* (2013.01)

(58) Field of Classification Search
CPC .......... G06F 17/16; G06F 7/575; G06F 7/483; G06F 7/523; G06F 7/44; G06F 7/487; G06N 3/02; G06N 3/04
See application file for complete search history.

(56) References Cited

U.S. PATENT DOCUMENTS

| | | | |
|---|---|---|---|
| 10,817,260 B1 * | 10/2020 | Huang | ........................ G06F 7/50 |
| 10,901,492 B1 * | 1/2021 | Bshara | ................. G06F 9/30105 |
| 2012/0072703 A1 * | 3/2012 | Srinivasan | ........... G06F 9/30014 |
| | | | 712/221 |
| 2018/0322390 A1 | 11/2018 | Das et al. | |
| 2019/0042250 A1 * | 2/2019 | Anders | ................ G06F 9/30036 |
| 2019/0065150 A1 * | 2/2019 | Heddes | ................... G06N 3/082 |
| 2019/0205746 A1 * | 7/2019 | Nurvitadhi | ............ G06N 3/0454 |

OTHER PUBLICATIONS

Hill, Mcgraw. "Lesson 01: Basic Processing Unit." Dauniv.ac.in, 2009, https://www.dauniv.ac.in/public/frontassets/coursematerial/computer-architecture/CompArchCh05L01BasicProcessingUnitsRevision.pdf. (Year: 2009).*
European Search Report for European Application No. 21167381.9, dated Sep. 27, 2021, 2 pages.

\* cited by examiner

*Primary Examiner* — Emily E Larocque
*Assistant Examiner* — Huy Duong
(74) *Attorney, Agent, or Firm* — Van Pelt, Yi & James LLP

(57) ABSTRACT

A device (e.g., integrated circuit chip) includes a first operand register, a second operand register, a multiplication unit, and a hardware logic component. The first operand register is configured to store a first operand value. The second operand register is configured to store a second operand value. The multiplication unit is configured to at least multiply the first operand value with the second operand value. The hardware logic component is configured to detect whether a zero value is provided and in response to a detection that the zero value is being provided: cause an update of at least the first operand register to be disabled, and cause a result of a multiplication of the first operand value with the second operand value to be a zero-value result.

20 Claims, 6 Drawing Sheets

BYPASSING ZERO-VALUE MULTIPLICATIONS IN A HARDWARE MULTIPLIER

BACKGROUND OF THE INVENTION

A whole class of complex artificial intelligence problems can be solved using neural networks. One common operation required by many neural networks is a multiplication operation, for example, when performing matrix operations. Since artificial intelligence problems are often computationally and data intensive, hardware solutions are often beneficial for improving performance. It is a technical challenge to create a hardware platform that has high computational performance and low power consumption. Therefore, there exists a need for techniques directed toward energy efficient, high throughput matrix multiplication schemes that do not introduce significant hardware complexity and expense.

BRIEF DESCRIPTION OF THE DRAWINGS

Various embodiments of the invention are disclosed in the following detailed description and the accompanying drawings.

DETAILED DESCRIPTION

Figure 1:
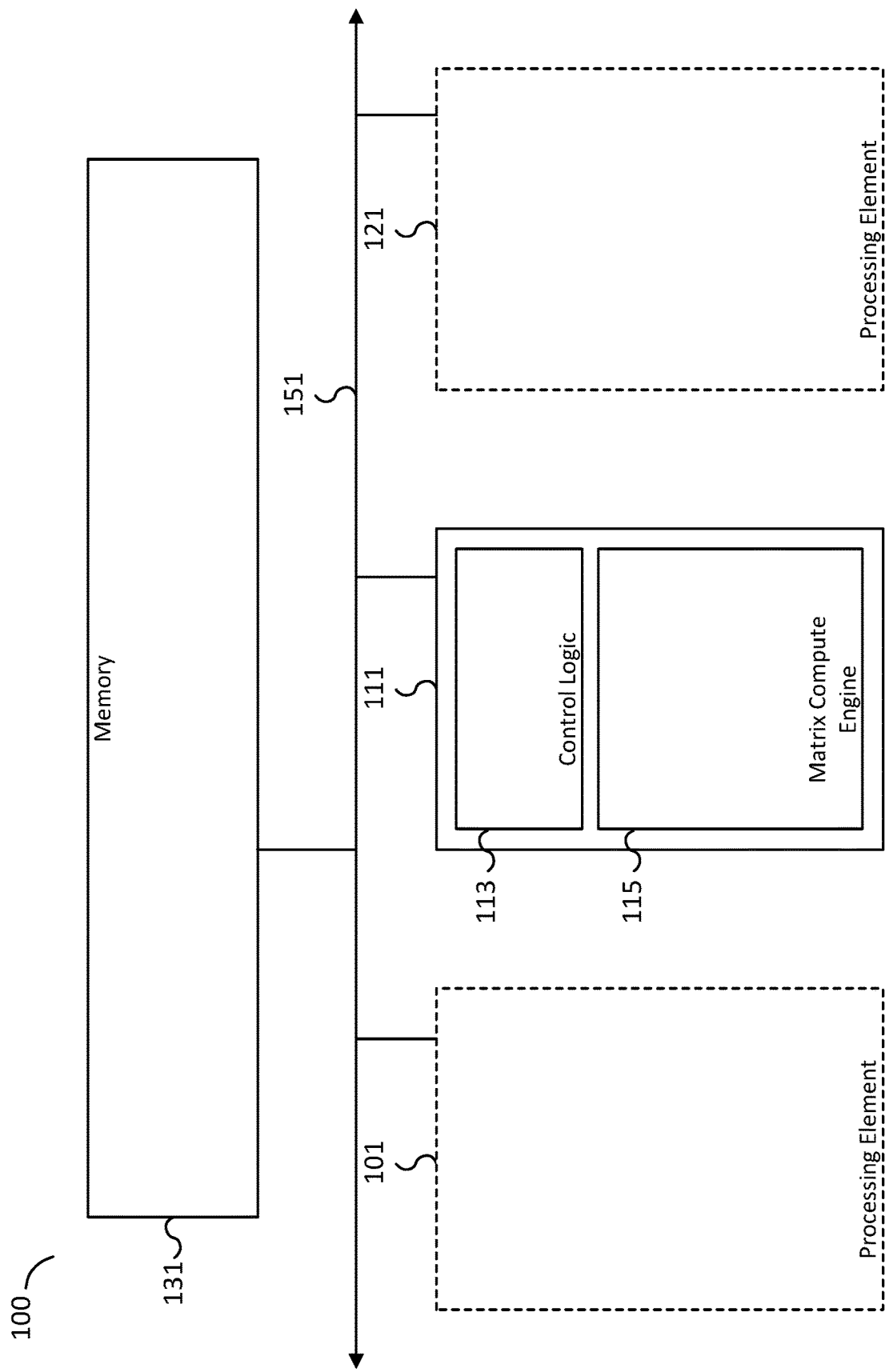
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device for improving the efficiency of hardware multiplication operations is disclosed. The disclosed device includes a first operand register configured to store a first operand value, a second operand register configured to store a second operand value, a multiplication unit configured to at least multiply the first operand value with the second operand value, and a hardware logic component configured to: detect whether a zero value is provided and, in response to a detection that the zero value is being provided, cause an update of at least the first operand register to be disabled and cause a result of a multiplication of the first operand value with the second operand value to be a zero-value result. Practical and technological benefits of the disclosed device include improved efficiency and performance of multiplication operations, e.g., by not wasting power on performing multiplications that are zero-result multiplications.

A common component in many neural networks is a fast, efficient hardware matrix multiplier. Typically, the matrix multiplier is a large contributor to overall power consumption of an integrated circuit on which neural network hardware is implemented. Because many neural networks receive a large fraction of zeros in the activations (as well as some zero weights), many multiplications do not need to be fully performed. The disclosed techniques can reduce the power consumption of the hardware matrix multiplier by bypassing multiplications in which at least one input (of a multiplication) is zero. If at least one input is zero, then the result of the multiplication can be determined to be zero without performing any computation.

In various embodiments, a hardware matrix multiplier includes a plurality of dot product modules, each of which computes a dot product of a row of a first input matrix (A) with a column of a second matrix (B). In some embodiments, each dot product module includes a layer of input registers (that store elements of A and B) and are coupled to a series of hardware multipliers (also referred to herein as multipliers and multiplication units) that are connected to an adder tree. In each cycle, a new column of B may be loaded, which may then be broadcasted to all of the dot product modules in order to determine dot products with all rows of A in parallel. In a hardware multiplier that does not bypass zero-value results, if a new element of B is zero, then a multiplication occurs (as it would if the new element of B were a nonzero value). Power is consumed due to logic gates switching even though the final result of the multiplication is already known to be zero.

In various embodiments, wasting of power via switching of logic gates in a multiplication that is already known to have a zero-value result is avoided by making specified modifications to hardware multipliers. In various embodiments, before storing new elements of A and/or B in input registers, it is determined whether one of the elements is zero. In some embodiments, only one of the elements is examined to determine if it is a zero, which may be more efficient because zeros can be more frequent in one matrix than in the other (e.g., more frequent in activations than in weights). In response to a detection that a zero value is being provided, a signal can be sent to cause the input registers to not be updated, which avoids wasting power switching the logic gates of the registers. In some embodiments, a multiplexer or a flip-flop with an enable or disable signal is used to indicate whether input registers should be updated. In various embodiments, an "is zero" signal is set to high if a newly loaded element is zero and. The "is zero" signal can be routed to output logic of a hardware multiplier. A high value of the "is zero" signal causes the current output of the hardware multiplier to not be used as the final result (the current output of the hardware multiplier would be the output that was computed with the previous element of B because input registers would not have been updated). Instead, a zero value is used as the final result. Example implementations of such output logic are described in further detail below.

FIG. 1 is a block diagram illustrating an embodiment of a system for solving artificial intelligence problems using a neural network. For example, system 100 may be applied to use a neural network to solve problems such as image recognition and recommendation system matches. In the example shown, system 100 includes multiple processing elements such as processing elements 101, 111, and 121 connected to memory unit 131 via bus 151. System 100 may include fewer or more processing elements. For example, the number of processing elements can be scaled up or down depending on the intended computational and data requirements. In some embodiments, the processing elements, such as 101, 111, and 121, are communicatively connected to one another and/or memory unit 131 via bus 151. For example, the memory unit may be a last level cache (LLC) and/or may be implemented using static random-access memory (SRAM). Each processing element may be utilized by system 100 to perform matrix compute operations such as matrix multiplications including integer and floating-point multiplications.

In some embodiments, a communication bus, such as bus 151, is used to transmit processing element instructions and optional instruction arguments. For example, a matrix operation and matrix operands may be transmitted to a processing element, such as processing elements 101, 111, and/or 121, via bus 151. Additional processing element instructions may include multiplication operation instructions such as integer or floating-point multiplication operation instructions. In various embodiments, a large, complex artificial intelligence problem can be solved using system 100 by subdividing the problem into smaller sub-problems. The smaller sub-problems can be assigned and distributed to different processing elements. The results of the smaller sub-problems can be merged to determine the solution to the larger and more complex problem. In some scenarios, the sub-problems are solved in parallel and/or in pipelined stages. In some scenarios, the result from a first processing element is fed as an input to a second processing element.

In some embodiments, each processing element of system 100 includes at least a control logic unit and a matrix compute engine. As shown with respect to processing element 111, processing element 111 includes control logic 113 and matrix compute engine 115. Processing elements 101 and 121 are shown as dotted boxes and some details of processing elements 101 and 121 are not shown. In some embodiments, the control logic unit of a processing element is used to control the operation of the processing element, including the operation of the processing element's matrix compute engine. In the example shown, control logic 113 processes instructions directed to processing element 111 via communication bus 151. For example, a processing element instruction may include an integer or floating-point multiplication instruction. In some embodiments, control logic 113 determines how to perform the integer or floating-point multiplication using matrix compute engine 115, including how to determine components of integer or floating-point number operands. In some embodiments, control logic 113 receives processing element instructions via bus 151 and can be used to initiate retrieving and/or writing data from/to memory 131.

In some embodiments, matrix compute engine 115 is a hardware matrix compute engine for performing matrix operations including operations related to integer multiplication, floating-point multiplication, matrix multiplication, and/or convolution operations. For example, matrix compute engine 115 may be a matrix engine for performing dot product operations requiring integer or floating-point multiplications and addition operations. In some embodiments, the convolution operations supported include depthwise, groupwise, normal, regular, pointwise, two-dimensional, and/or three-dimensional convolutions, among others. For example, matrix compute engine 115 may receive a first input matrix such as a subset of a large image and a second input matrix such as a filter, kernel, or convolution matrix, etc. to apply to the first input matrix. Matrix compute engine 115 can be used to perform a convolution operation using the two input matrices to determine a resulting output matrix. In some embodiments, matrix compute engine 115 includes input and/or output buffers for loading input data matrices or vectors and writing out a result data matrix or vector. In some embodiments, matrix compute engine 115 includes multiple vector units and each vector unit includes a vector multiply unit and a vector adder unit.

Figure 2:
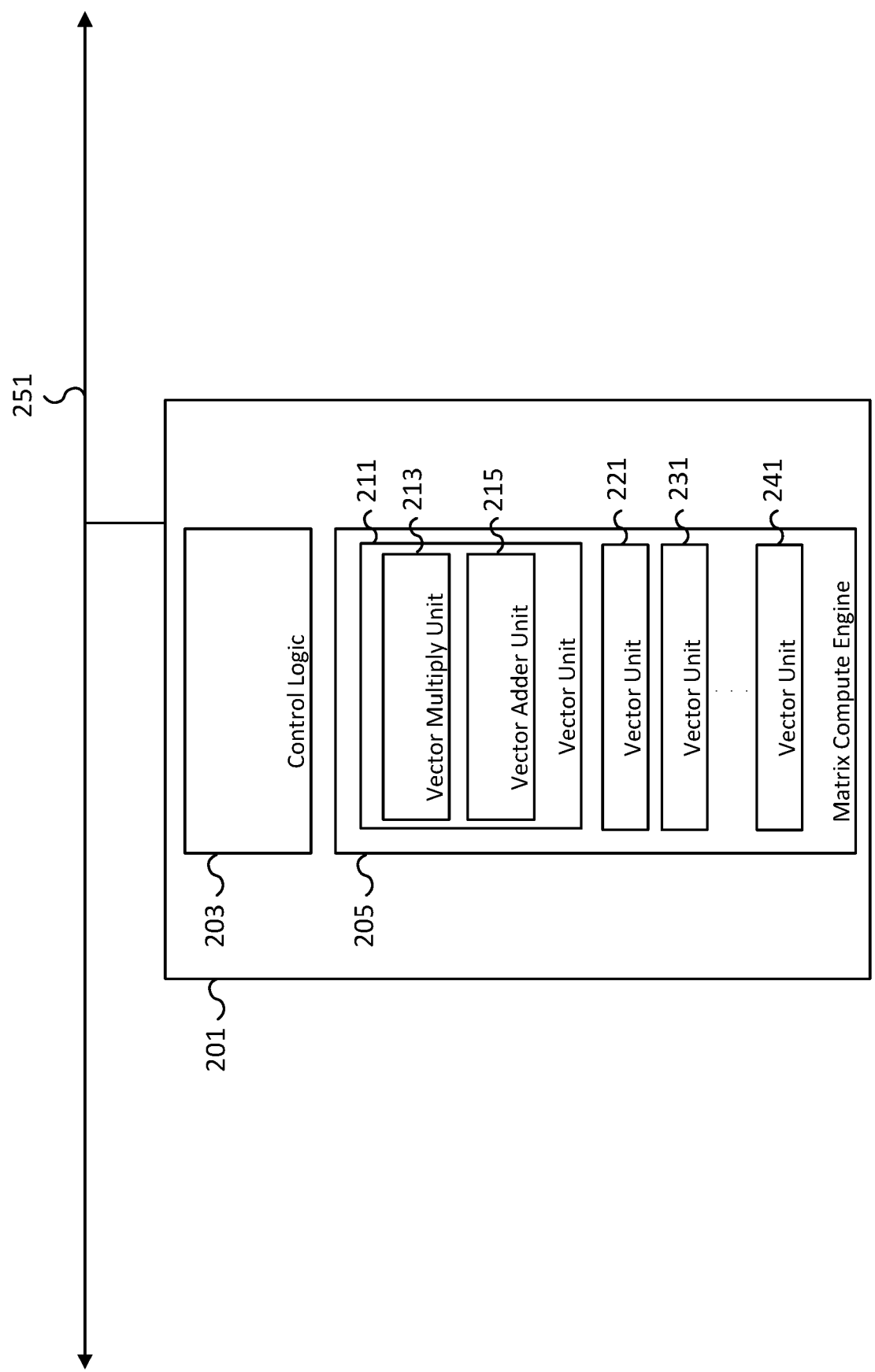
FIG. 2 is a block diagram illustrating an embodiment of a processing element for solving artificial intelligence problems using a neural network.

FIG. 2 is a block diagram illustrating an embodiment of a processing element for solving artificial intelligence problems using a neural network. In the example shown, processing element 201 is communicatively connected to bus 251. Processing element 201 includes control logic 203 and matrix compute engine 205. Matrix compute engine 205 includes vector units 211, 221, 231, and 241. Matrix compute engine 205 may include more or fewer vector units. For example, a matrix compute engine may include 32 vector units, each capable of processing two 32-element vectors. In various embodiments, each vector unit includes a vector multiply unit and a vector adder unit. In the example shown, vector unit 211 includes vector multiply unit 213 and vector adder unit 215. For simplicity, the vector multiply and vector adder units of vector units 221, 231, and 241 are not shown but function similarly to vector multiply unit 213 and vector adder unit 215. In some embodiments, processing element 201 is processing element 101, 111, and/or 121 of FIG. 1. In some embodiments, control logic 203 and matrix compute engine 205 are, respectively, control logic 113 and matrix compute engine 115 of FIG. 1.

In some embodiments, matrix compute engine 205 receives input matrix (or vector) operands to perform matrix operations. For example, matrix compute engine 205 may receive one or more data input vectors corresponding to a portion of an image and at least one weight input vector corresponding to a filter matrix. The input vectors, such as input data and weight vectors, may be passed as arguments to a vector unit, such as one of vector units 211, 221, 231, and 241, of matrix compute engine 205. For example, a vector unit of matrix compute engine 205 may determine a matrix result, such as a dot product result, using a data input vector and weight input vector pair. In some embodiments, matrix compute engine 205 includes 32 vector units. Each vector unit may take two 32-element vectors as arguments and each determine a 32-element vector result. In some embodiments, the result is a single element result and taken across all vector units of matrix compute engine 205. In some embodiments, the result is an output vector result. In various embodiments, output results are determined by accumulating partial vector results across multiple vector unit operations. For example, a multiplication operation can be decomposed into multiple multiplication operations and the results summed. The number of vector units of matrix compute engine 205 can vary as can the vector unit lengths and element sizes. For example, elements may be 4-bit, 8-bit, 16-bit, 1-byte, 2-byte, 4-byte, or another appropriate size. Depending on the capabilities of the vector unit, different element sizes can be natively supported.

In some embodiments, each vector unit of matrix compute engine 205, such as vector units 211, 221, 231, or 241, receives two vector operands and can perform one or more vector operations. For example, a vector unit can compute the result of multiple multiply operations by multiplying each element of the first input vector with a corresponding element of a second input vector. The resulting multiplication results can be accumulated and used for future operations, such as summing partial results. For example, a vector unit result can be accumulated and used as an operand to a subsequent operation performed by the vector unit.

In some embodiments, each vector unit of matrix compute engine 205, such as vector units 211, 221, 231, or 241, includes a vector multiply unit and a vector adder unit. Each vector multiply unit, such as vector multiply unit 213, is configured to multiply corresponding elements received via input vector operands. In some embodiments, the result is a vector of multiplication results. For example, for two 32-bit input vectors, the result of a vector multiply unit is a vector of 32-bit multiplication results. The first element from a first input vector is multiplied with the first element of a second input vector. Similarly, the second element from the first input vector is multiplied with the second element of the second input vector. In various embodiments, the vector of multiplication results is passed to a vector adder unit of the vector unit. For example, vector multiply unit 213 can pass its multiplication results to vector adder unit 215. Vector adder unit 215 can be used for addition operations such as summing partial results, computing at least in part a dot product result, or other appropriate functionality.

In some embodiments, each vector adder unit of a vector unit, such as vector adder unit 215, is configured to compute addition operations using elements from an input vector. For example, the sum of selected elements from a vector of multiplication results computed by vector multiply unit 213 is computed by vector adder unit 215. In some embodiments, the result of a vector adder unit is a dot product of the vectors used as inputs to the corresponding vector multiply unit. In various embodiments, each vector adder unit, such as vector adder unit 215, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In some embodiments, specified partial sums may be outputted as a result of the adder unit. In various embodiments, each adder tree computes partial sums in parallel to arrive at a result sum. The parallel operation significantly improves the efficiency of summing a vector of numbers. In various embodiments, multiple vector units can operate in parallel to compute multiple results in parallel, significantly improving the throughput of matrix compute engine 205.

In some embodiments, matrix compute engine 205 includes one or more accumulators, for example, to accumulate the results of each vector unit. In some embodiments, an accumulator is included as part of a vector unit or as part of matrix compute engine 205 as appropriate. The accumulator(s) can be used to sum the results computed across multiple iterations of the vector units. For example, the result from one iteration of a vector unit can be stored in an accumulator and added to the result of the next iteration of the vector unit. In some embodiments, the accumulator is a vector accumulator. For example, the accumulator may be sized based on the size of an output vector of matrix compute engine 205. In various embodiments, once matrix processing is complete, the accumulator results are pushed to memory via bus 251.

Figure 3:
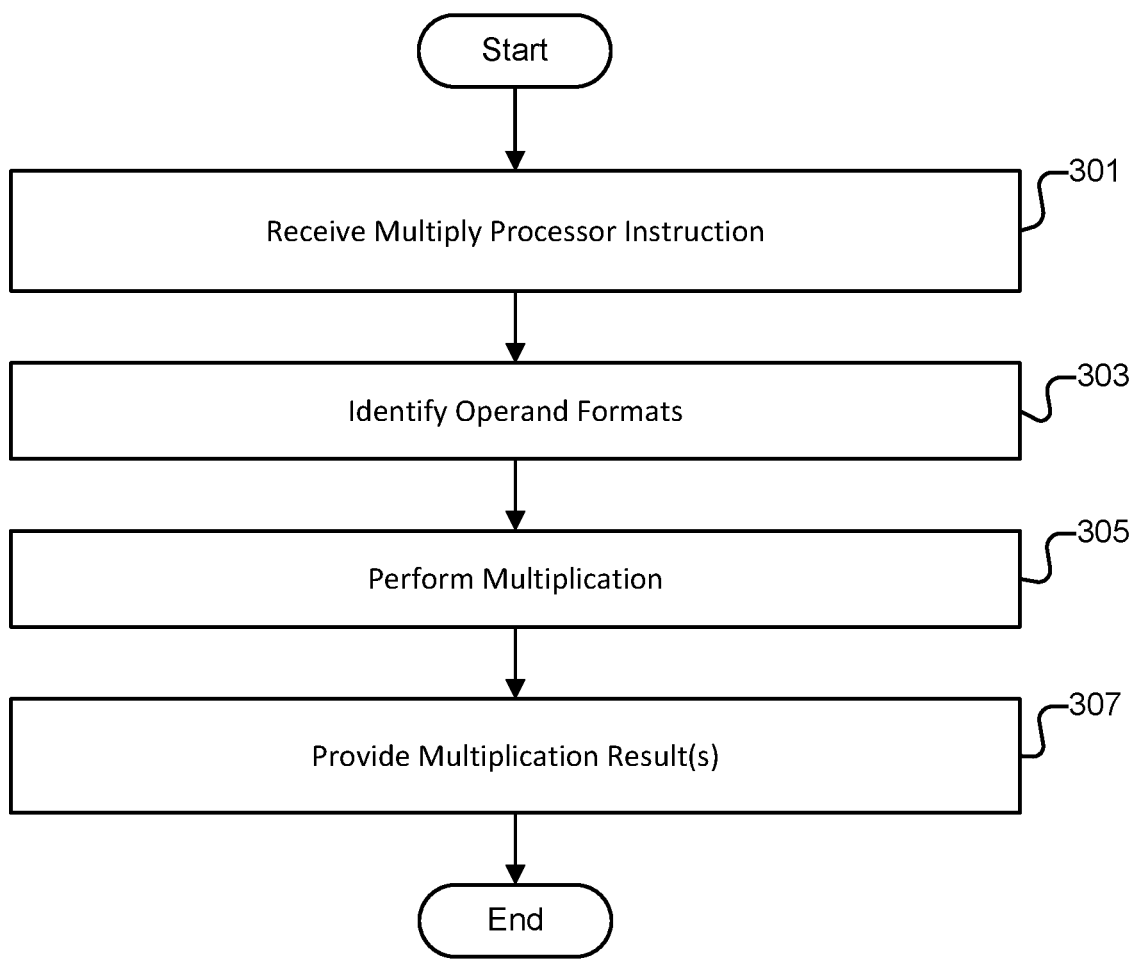
FIG. 3 is a flow chart illustrating an embodiment of a process for performing a multiplication in hardware.

FIG. 3 is a flow chart illustrating an embodiment of a process for performing a multiplication in hardware. In the process of FIG. 3, an integer or floating-point multiplication operation using multiplication operands of various formats may be performed. In various embodiments, a processing element handles multiple integer or floating-point number formats. In some embodiments, the process of FIG. 3 is performed in response to receiving a multiply operation instruction at a control unit of a processing element, such as processing elements 101, 111, and/or 121 of FIG. 1 and/or processing element 201 of FIG. 2.

At 301, a multiply processor instruction is received. The multiply operation instruction may specify two integer or floating-point numbers. In some embodiments, the instruction is a vector instruction. For example, two vectors of operands may be received and each element of a first vector is to be multiplied with a corresponding element of a second vector.

At 303, the operand formats are identified. In various embodiments, multiple different integer and floating-point formats are supported by the processing element. In some embodiments, format is specified by the multiply processor instruction. For example, a flag in the multiply processor instruction can identify a type of integer format or a type of floating-point format.

At 305, a multiplication is performed. For example, a multiplication of two integer or floating-point numbers is performed. As another example, a multiplication of two vectors of integers or floating-point numbers can also be performed.

At 307, the multiplication result(s) are provided. For example, result(s) can be provided to the next step for solving an artificial intelligence problem. In some embodiments, the result(s) are utilized to solve the next layer of a neural network and/or combined with results from other processing elements. In some embodiments, the result(s) are written back to memory such as memory 131 of FIG. 1 where the result(s) can be utilized by a subsequent operation.

Figure 4:
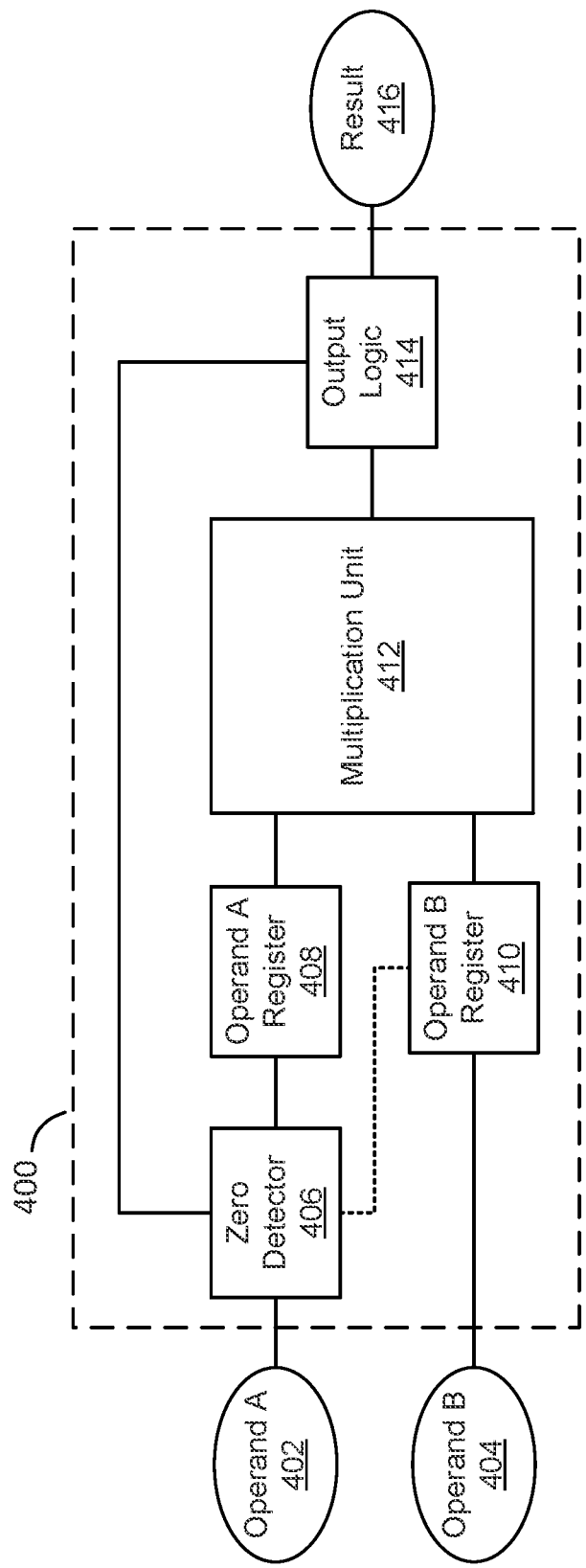
FIG. 4 is a block diagram illustrating an embodiment of a system for bypassing zero-result multiplications.

FIG. 4 is a block diagram illustrating an embodiment of a system for bypassing zero-result multiplications. In some embodiments, system 400 is included in vector multiply unit 213 of FIG. 2. In various embodiments, system 400 is a hardware multiplier system that is configured to bypass zero-result multiplications. In various embodiments, a vector multiply unit, e.g., vector multiply unit 213 of FIG. 2, includes a plurality of instances of system 400.

In the example shown, system 400 receives operand A 402 and operand B 404 as inputs and produces result 416 as a final output. In the example shown, system 400 includes zero detector 406, operand A register 408, operand B register 410, multiplication unit 412, and output logic 414. In various embodiments, operand A 402 and operand B 404 are integer or floating-point numbers. Examples of integer formats include 8-bit, 16-bit, 32-bit, signed, unsigned, etc. formats. Examples of floating-point formats include half-precision, single-precision, Brain Floating Point, etc. In various embodiments, operand A 402 is to be multiplied with operand B 404 to obtain result 416.

In the example shown, operand A register 408 stores operand A 402 and operand B register 410 stores operand B 404. In various embodiments, operand A register 408 and operand B register B 410 are hardware registers (e.g., wherein each register comprises a plurality of flip-flop circuits), scratch memory locations, or another appropriate memory. Operand A register 408 and operand B register 410 are coupled to multiplication unit 412. Multiplication unit 412 is a hardware multiplier that produces a multiplication result based on inputs stored in operand A register 408 and operand B register 410. In some embodiments, multiplication unit 412 is configured to handle integer multiplications (when operand A register 408 and operand B register 410 store numbers in an integer format). Multiplication unit 412 may also be configured to handle floating-point multiplications (when operand A register 408 and operand B register 410 store numbers in a floating-point format).

If at least one of operand A register 408 or operand B register 410 stores a zero value, the multiplication result is necessarily a zero-value result (without needing to perform computation). In various embodiments, new values of operand A 402 and operand B 404 are continually supplied to system 400 so that multiplication results are continually being produced. On each cycle (e.g., a clock cycle when system 400 performs one multiplication per clock cycle), operand A register 408 and operand B register 410 are typically updated (loaded with the new operand values) to reflect the multiplication operation to be performed for that cycle. However, operand A register 408 and operand B register 410 do not need to be updated if at least one of the new operands during a new cycle has a zero value. Stated alternatively, if at least one zero input to multiplication unit 412 is detected, operand A register 408 and operand B register 410 are not updated, which saves power due to not activating switching circuits (e.g., logic gates) used to update the registers. This reduces overall power consumption associated with using multiplication unit 412 to perform multiplication operations.

In the example shown, zero detector 406 determines whether operand A 402 has a zero value. In some embodiments, zero detector 406 is implemented, at least in part, using a digital comparator that detects whether operand A 402 is equal to zero. The digital comparator may be implemented using a plurality of digital bit-comparators, wherein each digital bit-comparator is implemented using digital logic gates. In various embodiments, in response to a detection of a zero value by zero detector 406, zero detector 406 sends a disable signal to operand A register 408 and operand B register 410 to cause updating of operand A register 408 and operand B register 410 to be disabled and another data signal to output logic 414 to cause result 416 to be a zero-value result. In the example shown, only operand A 402 is examined to determine if it is a zero. It is also possible to examine operand B 404 by placing another zero detector in the data path between operand B 404 and operand B register 410. If operand B 404 is examined, operand A register 408 and operand B register 410 updating can be disabled in response to a detection that operand B 404 has a zero value. In many scenarios, it may be more efficient to examine only one of the operands if zeros are more frequent in one group of operands (e.g., activations in an activation matrix corresponding to operand A 402) than in another group of operands (e.g., weights in a weights matrix corresponding to operand B 404). In such a scenario, examining only one operand saves power by consuming power for only one zero detector.

In the example shown, output logic 414 is communicatively connected to zero detector 406. In various embodiments, in response to a signal from zero detector 406 that a zero is provided, output logic 414 causes result 416 to be a zero-value result, and in response to a signal from zero detector 406 that a zero is not being provided, output logic 414 causes result 416 to be a multiplication result that is the product of operand A 402 and operand B 404 as outputted by multiplication unit 412. In some embodiments, output logic 414 includes a plurality of AND gates in which each AND gate's inputs are an output bit of multiplication unit 412 and a data signal from zero detector 406, wherein the data signal is low when a zero has been detected and high when no zero has been detected. Thus, result 416 has all zero bits when zero detector 406 detects operand A 402 to be zero and has the output bits of multiplication unit 412 when zero detector 406 does not detect operand A 402 to be zero. It is also possible to use other logic gate combinations and/or multiplexer designs instead of using AND gates.

In the example illustrated in FIG. 4, portions of the communication path between the components are shown. Other communication paths may exist, and the example of FIG. 4 has been simplified to illustrate the example clearly. For example, signals from zero detector 406 that disable the updating of registers are not shown explicitly. In various embodiments, zero detector 406 is communicatively connected to both operand A register 408 and operand B register 410 so that a disable signal can be sent to both registers. Although single instances of components have been shown to simplify the diagram, additional instances of any of the components shown in FIG. 4 may exist. The number of components and the connections shown in FIG. 4 are merely illustrative. Components not shown in FIG. 4 may also exist.

Figure 5A:
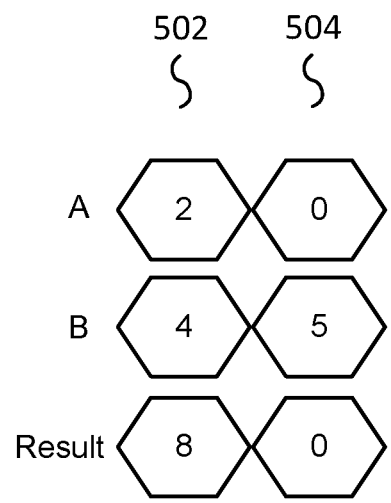
FIGS. 5A and 5B are diagrams illustrating use of a data signal to control bypassing of a zero-result multiplication.
Figure 5B:
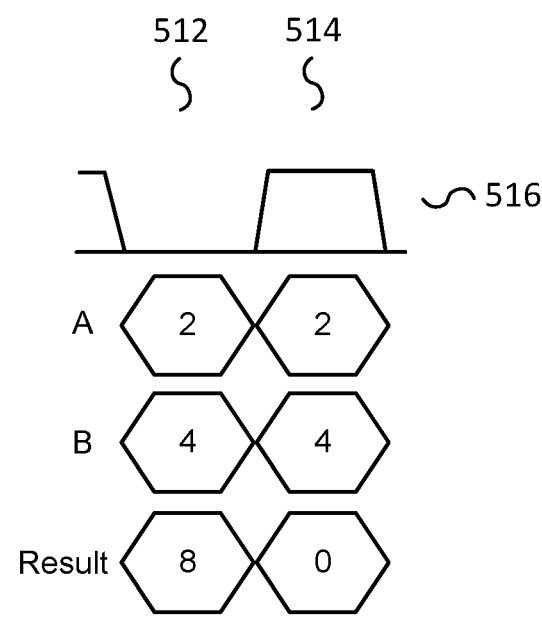

FIGS. 5A and 5B are diagrams illustrating use of a data signal to control bypassing of a zero-result multiplication. FIGS. 5A and 5B illustrate how contents of operand and result storage (e.g., registers) differ when a system for bypassing zero-result multiplications is used. The example of FIG. 5A shows multiplication of operands during two consecutive cycles 502 and 504 (e.g., two consecutive clock cycles) without using a system for bypassing zero-result multiplications. During cycle 502, the multiplication to be performed is 2×4=8. Operand A storage is loaded with the value 2, operand B storage is loaded with the value 4, and the multiplication result of the two operands is 8. In various embodiments, the operands are multiplied using a multiplication unit. During cycle 504, the multiplication to be performed is 0×5=0. Operand A storage is loaded with the value 0, operand B storage is loaded with the value 5, and multiplication of the two operands is 0.

The example of FIG. 5B illustrates use of a data signal indicating detection of an operand value of zero. In the example of FIG. 5B, a system for bypassing zero-result multiplications is used. In some embodiments, the system for bypassing zero-result multiplications is system 400 of FIG. 4. In some embodiments, operands to be multiplied are operand A 402 and operand B 404 of FIG. 4. In the example of FIG. 5B, during consecutive cycles 512 and 514 (e.g., two consecutive clock cycles), the multiplications that are to be performed are the same as during cycles 502 and 504 of FIG. 5A (2×4=8 and then 0×5=0). Zero detection signal 516 is a data signal indicating the detection of at least one zero operand during a cycle. In some embodiments, zero detection signal 516 is produced by zero detector 406 of FIG. 4. During cycle 512, none of the operands to be multiplied (2 and 4) have a zero value; thus, signal 516 is low during cycle 512. As with cycle 502 of FIG. 5A, during cycle 512, operand A storage is loaded with the value 2, operand B storage is loaded with the value 4, and the multiplication result of the two operands is 8. In some embodiments, operand A storage is operand A register 408 of FIG. 4, operand B storage is operand B register 410 of FIG. 4, and the multiplication result is generated using multiplication unit 412 of FIG. 4.

During cycle 514, one of the operands to be multiplied (0 and 5) has a zero value; thus, signal 516 is high during cycle 514. In various embodiments, this high signal causes operand A storage and operand B storage to not update their contents (in contrast to what is shown for cycle 504 of FIG. 5A). In the example shown, during cycle 514, the contents of operand A storage and operand B storage have not updated. Stated alternatively, in the example shown, during cycle 514, operand A storage still stores the value 2 from cycle 512 and operand B storage still stores the value 4 from cycle 512. However, the result of the multiplication is still the correct value of 0 (the same as for cycle 504 of FIG. 5A). In various embodiments, zero detection signal 516 is received by output logic, which causes the final result of the multiplication to be zero when zero detection signal 516 is high. In some embodiments, the output logic is output logic 414 of FIG. 4. A benefit of bypassing zero-result multiplications as shown in FIG. 5B is reduced power consumption due to not updating operand storage (e.g., registers) as frequently but still obtaining correct multiplication results.

Figure 6:
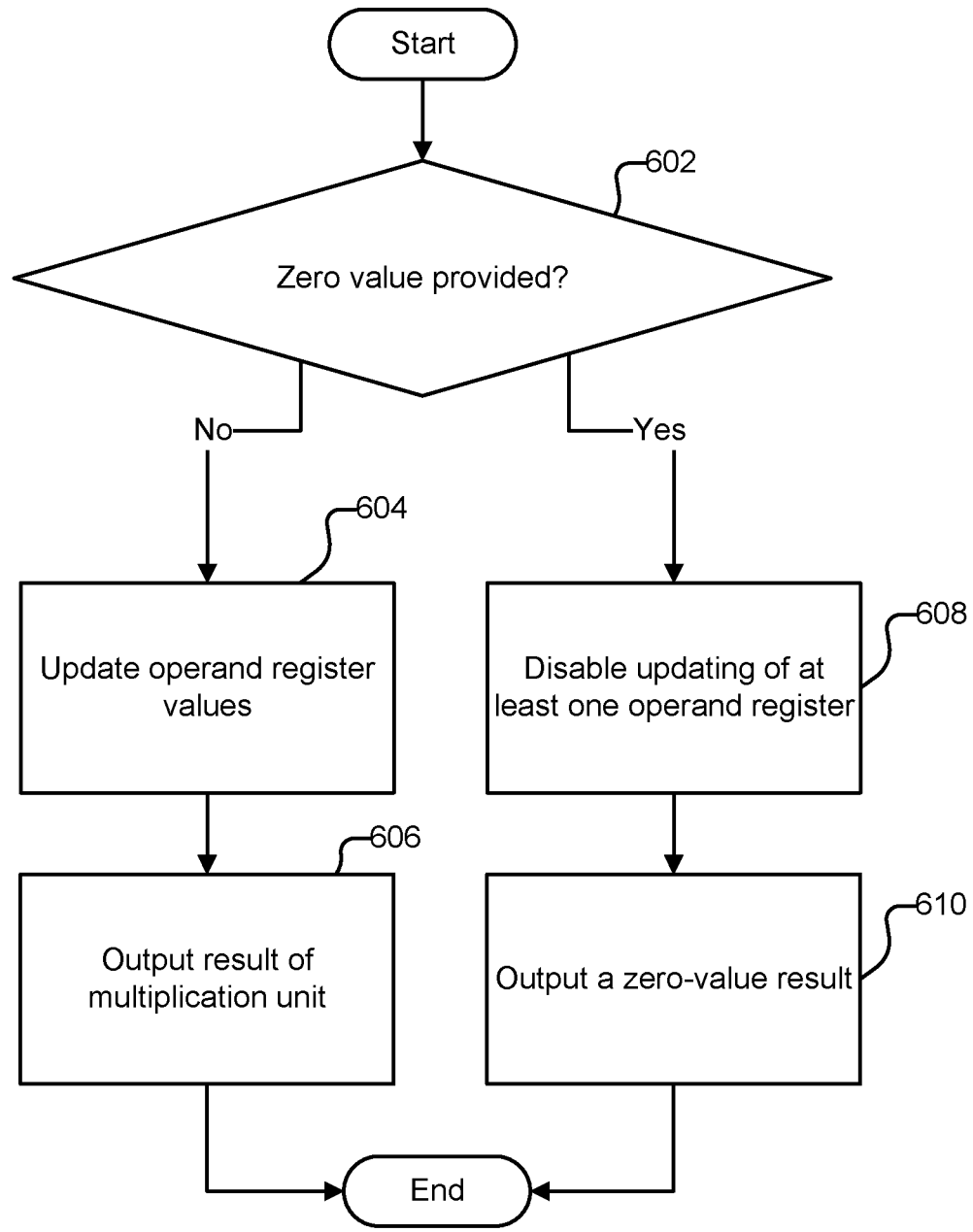
FIG. 6 is a flow chart illustrating an embodiment of a process for bypassing zero-result multiplications.

FIG. 6 is a flow chart illustrating an embodiment of a process for bypassing zero-result multiplications. In some embodiments, the process of FIG. 6 is performed by system 400 of FIG. 4. In some embodiments, at least a portion of the process of FIG. 6 is performed in 305 of FIG. 3.

At 602, it is determined whether a zero value is provided. In some embodiments, a single operand that is received is examined (e.g., operand A 402 of FIG. 4). It is also possible to examine more than one operand (e.g., also examine operand B 404 of FIG. 4 in addition to operand A 402) and determine if at least one of the operands has a zero value. In some embodiments, zero detector 406 determines whether a zero value is provided.

If at 602 it is determined that no zero value has been provided, at 604, operand register values are updated. In some embodiments, the operand registers are operand A register 408 and operand B register 410 of FIG. 4. The operand registers are loaded with the current operand values that are to be multiplied. Because no zero value has been provided, the output is not already known to be zero (or any other number, in general). The contents of the operand registers need to be updated and a multiplication unit needs to perform a multiplication to determine a multiplication result.

At 606, a result of a multiplication unit is outputted. In some embodiments, a result of multiplication unit 412 of FIG. 4 is outputted. The multiplication by the multiplication unit needs to be performed because the multiplication result is not already known to be zero. In some embodiments, output logic 414 of FIG. 4 causes the result of multiplication unit 412 to be selected as a final result to be provided (e.g., result 416 of FIG. 4) in response to the determination that no zero-value operand has been provided.

If at 602, it is determined that a zero value has been provided, at 608, updating of at least one operand register is disabled. In various embodiments, updating of more than one operand register is disabled (e.g., updating of both operand A register 408 and operand B register 410 of FIG. 4 is disabled). The one or more registers do not need to be updated because if it is determined that a zero value has been provided, then the result of the multiplication is already known to be zero without a need to load the registers and perform a multiplication using the contents of the updated registers. In some embodiments, multiplexers and/or basic digital logic gates are used to implement disabling signals.

At 610, a zero-value result is outputted. A multiplication result of a multiplication unit (e.g., of multiplication unit 412 of FIG. 4) is not needed because the multiplication result is already known to be zero. In some embodiments, output logic 414 of FIG. 4 outputs a zero-value result (e.g., to provide result 416 of FIG. 4) in response to the determination that a zero-value operand has been provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
a plurality of processing elements communicatively connected to one another and to a memory unit; and
the memory unit;
wherein a processing element of the plurality of processing elements comprises a control logic unit and a plurality of vector units, wherein:
the control logic unit is configured to control operation of the processing element, including by being configured to determine components of multiplication operands; and
each vector unit of the plurality of vector units comprises a vector multiply unit and is configured to utilize the vector multiply unit to compute a dot product result, and wherein the vector multiply unit comprises:
a first operand register configured to store a first operand value;
a second operand register configured to store a second operand value;
a multiplication unit configured to at least multiply the first operand value with the second operand value; and
a zero detector component configured to:
detect whether a zero value is provided;
in response to a detection at the same zero detector component that the zero value is being provided, disable updates to a plurality of operand registers configured to provide operands to the multiplication unit including the first operand register and the second operand register, wherein the first operation register and the second operand register are both directly connected to the same zero detector component configured to receive an input of the first operand value but not the second operand value and wherein the first operation register and the second operand register are not connected any other zero detector component besides the same zero detector component configured to receive the input of the first operand value but not the second operand value; and in response to the detection that the zero value is being provided, cause a result of a multiplication of the first operand value with the second operand value to be a zero-value result.

2. The device of claim 1, wherein the first operand value and the second operand value are in an integer number format.

3. The device of claim 1, wherein the first operand value and the second operand value are in a floating-point number format.

4. The device of claim 1, wherein the control logic unit is further configured to receive a multiply operation instruction that specifies an operand format type.

5. The device of claim 1, wherein the zero detector component includes a comparator that is configured to detect whether the zero value is provided.

6. The device of claim 1, wherein the zero detector component is configured to, in response to the detection that the zero value is being provided, cause an update of at least the first operand register to be disabled including by being configured to transmit a disable signal to the first operand register.

7. The device of claim 1, wherein the zero detector component is further configured to, in response to the detection that the zero value is being provided, cause an update of the second operand register to be disabled.

8. The device of claim 7, wherein the zero detector component is configured to, in response to the detection that the zero value is being provided, cause an update of the first operand register and the update of the second operand register to be disabled including by being configured to transmit disable signals to both the first operand register and the second operand register.

9. The device of claim 1, wherein the zero detector component is configured to, in response to the detection that the zero value is being provided, cause the result of the multiplication of the first operand value with the second operand value to be the zero-value result including by being configured to transmit a signal indicating the detection that the zero value is being provided to an output logic component.

10. The device of claim 9, wherein the output logic component is configured to select between an output of the multiplication unit and the zero-value result.

11. The device of claim 10, wherein the output logic component is configured to select the zero-value result in response to the detection that the zero value is being provided.

12. The device of claim 11, wherein the output logic component is configured to select the output of the multiplication unit in response to a detection by the zero detector component that a non-zero value is being provided.

13. The device of claim 1, wherein the multiplication of the first operand value with the second operand value is a part of a plurality of multiplications associated with a vector multiplication or a dot product operation.

14. The device of claim 1, wherein the multiplication of the first operand value with the second operand value is a part of a matrix operation.

15. The device of claim 1, wherein the multiplication of the first operand value with the second operand value is a part of an artificial neural network operation.

16. A method, comprising:
communicatively connecting a plurality of processing elements to one another and to a memory unit, wherein a processing element of the plurality of processing elements comprises a control logic unit and a plurality of vector units, wherein:
the control logic unit is configured to control operation of the processing element, including by being configured to determine components of multiplication operands; and
each vector unit of the plurality of vector units comprises a vector multiply unit and is configured to utilize the vector multiply unit to compute a dot product result;
receiving a first operand value that is to be stored in a first operand register of the vector multiply unit;
receiving a second operand value that is to be stored in a second operand register of the vector multiply unit, wherein the first operand value and the second operand value are to be multiplied by a multiplication unit of the vector multiply unit;
detecting, with a zero detector component of the vector multiply unit, whether a zero value is provided; and
in response to a detection at the same zero detector component that the zero value is being provided:
disabling updates to a plurality of operand registers configured to provide operands to the multiplication unit including the first operand register and the second operand register, wherein the first operation register and the second operand register are both directly connected to the same zero detector component configured to receive an input of the first operand value but not the second operand value and wherein the first operation register and the second operand register are not connected any other zero detector component besides the same zero detector component configured to receive the input of the first operand value but not the second operand value; and
causing a result of a multiplication of the first operand value with the second operand value to be a zero-value result.

17. A device, comprising:
a matrix compute engine comprising a plurality of vector units, wherein each vector unit of the plurality of vector units comprises a vector multiply unit and is configured to utilize the vector multiply unit to compute a dot product result, wherein the vector multiply unit comprises:
a first operand register configured to store a first operand value;
a second operand register configured to store a second operand value;
a multiplication unit configured to at least multiply the first operand value with the second operand value; and
a zero detector component configured to:
detect whether a zero value is provided;
in response to a detection at the same zero detector component that the zero value is being provided, disable updates to a plurality of operand registers configured to provide operands to the multiplication unit including the first operand register and the second operand register, wherein the first operation register and the second operand register are both directly connected to the same zero detector component configured to receive an input of the first operand value but not the second operand value and wherein the first operation register and the second operand register are not connected any other zero detector component besides the same zero detector component configured to receive the input of the first operand value but not the second operand value; and in response to the detection that the zero value is being provided, cause a result of a multiplication of the first operand value with the second operand value to be a zero-value result; and a control logic unit configured to process instructions directed to the matrix compute engine.

18. The device of claim 17, wherein the first operand value and the second operand value are in an integer number format.

19. The device of claim 17, wherein the first operand value and the second operand value are in a floating-point number format.

20. The device of claim 17, wherein the control logic unit is further configured to receive a multiply operation instruction that specifies an operand format type.

* * * * *